Dec. 7, 1926.  1,609,296
J. GOOD
INTERNAL COMBUSTION ENGINE AND METHOD OF OPERATING THE SAME
Filed Nov. 24, 1919  2 Sheets-Sheet 1
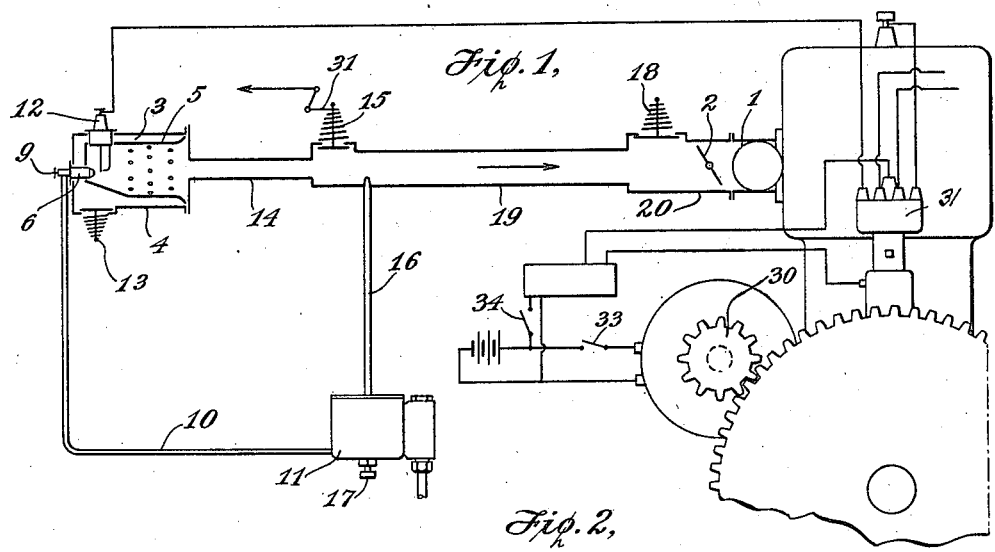
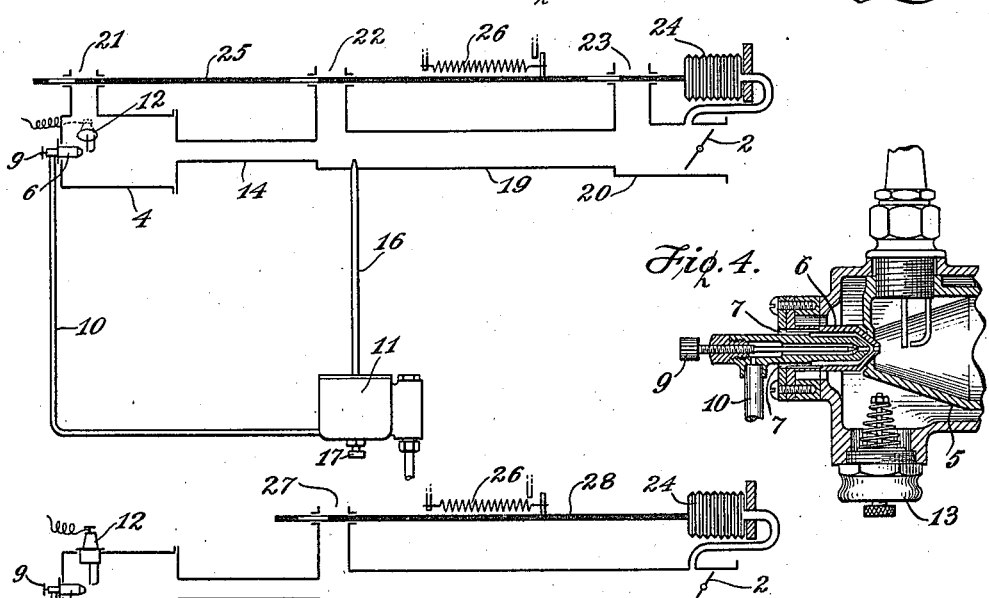
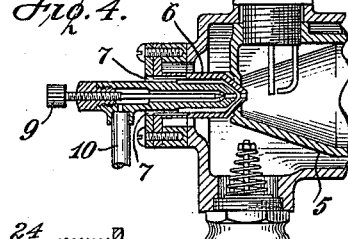
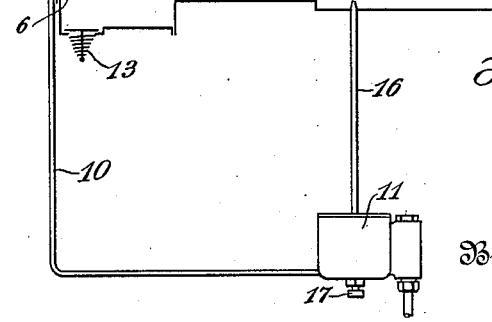

Dec. 7, 1926.   1,609,296
J. GOOD
INTERNAL COMBUSTION ENGINE AND METHOD OF OPERATING THE SAME
Filed Nov. 24, 1919   2 Sheets-Sheet 2
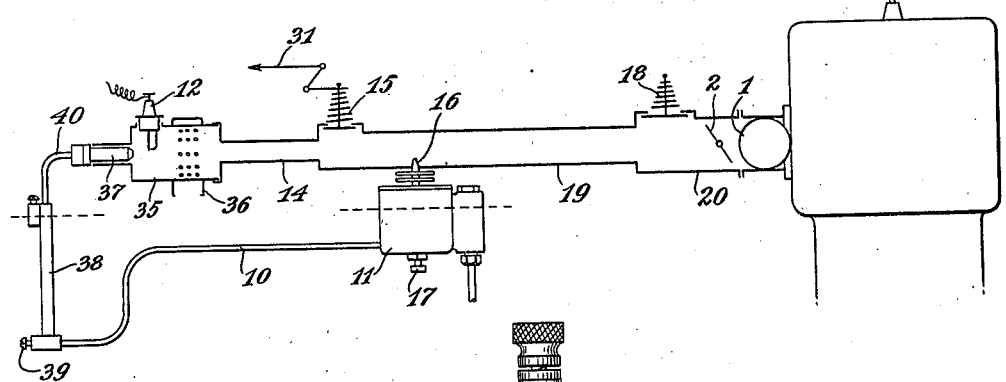
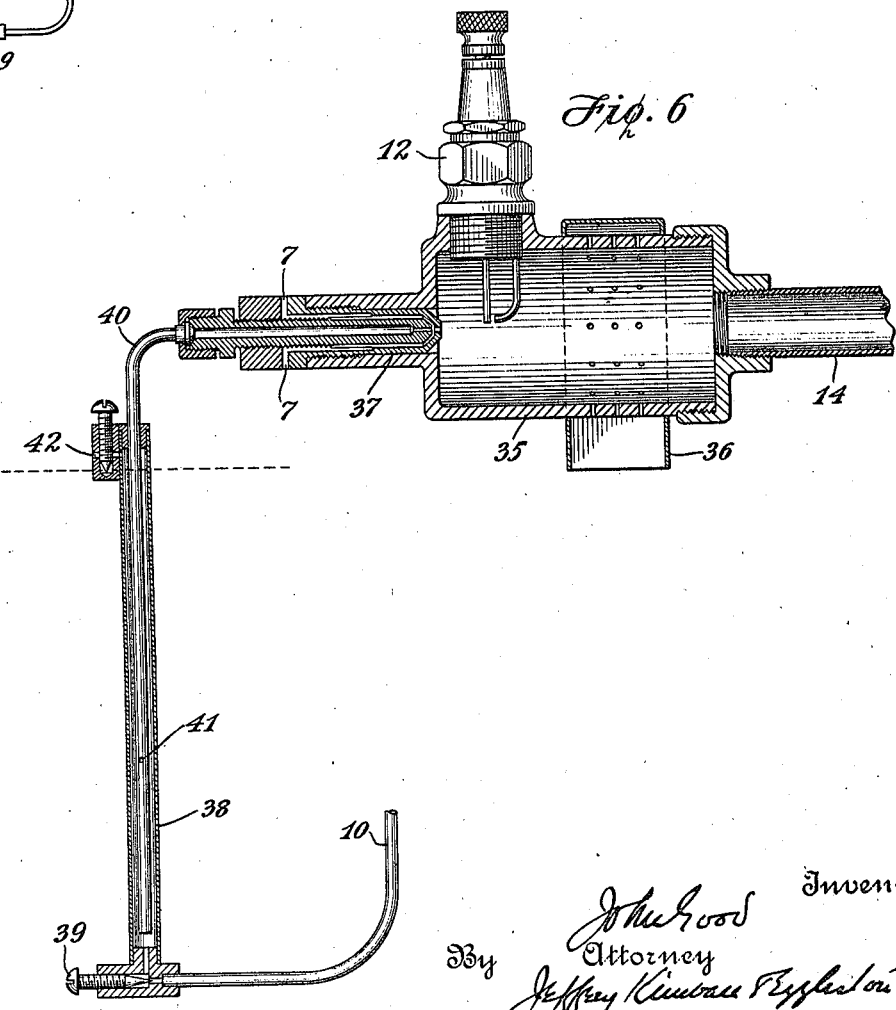

Patented Dec. 7, 1926.

1,609,296

UNITED STATES PATENT OFFICE.

JOHN GOOD, OF BROOKLYN, NEW YORK, ASSIGNOR TO GOOD INVENTIONS CO., OF NEW YORK, N. Y., A CORPORATION OF NEW YORK.

INTERNAL-COMBUSTION ENGINE AND METHOD OF OPERATING THE SAME.

Application filed November 24, 1919. Serial No. 340,314.

The invention consists in the means and method herein described for causing the suction effect in the intake of the rotating engine to create heat automatically for vaporizing or assisting in vaporizing the liquid fuel of the engine charge-mixture, and thereby providing means for quickly starting and efficiently operating internal combustion engines on low grade gasoline, kerosene and other liquid fuels, and especially in cold weather.

The drawings herewith represent the preferred form of the invention, more or less diagrammatically and illustrate also the method of operation which can likewise be carried out by various forms of apparatus as will later appear.

Fig. 1 is a longitudinal section through an engine intake passage embodying the invention;

Fig. 2 is a similar view of a modification;

Fig. 3 still another modification, and

Fig. 4 and enlarged axial section of part of the suction burner;

Fig. 5 a system with a modified form of burner and

Fig. 6 an enlarged section of the burner.

In Fig. 1, the engine shown may be assumed to be any ordinary multi-cylinder automotive engine having an intake manifold 1 connected by throttle 2 to an intake pipe or passage. At or near the end of this pipe or passage is connected a suction-operated burner 3. This burner is preferably constructed to burn liquid fuel taken from the main supply of the engine, although it may be otherwise constructed. In its preferred form it comprises an exterior casing 4 and an interior cylindrical perforated air-distributing shell 5. A fuel spray nozzle 6 is mounted in the end of the casing and shell, and is constructed with air holes 7 (Fig. 2) and a fuel duct 8 controlled by a needle valve 9 and receiving its fuel through pipe 10 from a fuel receptacle 11 at a lower level. The relative vacuum or suction effect in the intake passage causes the delivery from this nozzle of a finely air-atomized spray of the liquid fuel. A spark plug 12, located within the shell with its spark gap intercepting the spray serves to ignite it, notwithstanding that it is cold—i. e., not previously heated, and combustion-supporting air is at the same time drawn through the spring-seated air-entrance valve 13 and through the ring of holes in the distributing shell 5 into admixture with the ignited spray and round about it so that a flame is produced extending into the intake passage. The admission of liquid fuel, by the nozzle 6, and the admission of air by the valve 13 are relatively adjusted according to the proportions of an explosive mixture but ignition and combustion take place without explosive effect by virtue of the location of the igniter at a spot where the mixture (spray) is relatively rich in fuel and not yet homogeneously mixed with all the air from valve 13. In this manner ignition occurs readily and produces continuous combustion so long as the suction effect is maintained within the normal working limits as presently desired.

The flame thus produced is allowed to burn in the section of the intake passage marked 14, and is then diluted and also reduced in temperature by mixture with air sucked in through the valved entrance 15, thereby making a gaseous medium containing air and having a temperature high enough to be effective in vaporizing the fuel liquid which is now introduced into it from the orifice of a fuel nozzle 16. Liquid fuel is delivered through this nozzle from receptacle 11, also by the suction effect in the intake, the rate of delivery being under regulation by the needle valve 17. It is sprayed into the hot medium, producing thereof a mixture of flame products, air and fuel vapor. If the air admitted by the valve 15 is sufficient in amount, such mixture is explosive and may serve as the engine operating medium and pass directly to the engine as in the modification of Fig. 3 presently described. But it is preferred to admit, by the valve 15, only a small portion of the air necessary to make an explosive medium and admit the remainder through another valve 18 located nearer to the throttle as shown in Fig. 1. This arrangement affords a higher temperature for vaporizing the incoming liquid fuel in the passage marked 19. The air admitted by valve 18 then lowers the ultimate temperature and thereby maintains a satisfactory volumetric efficiency. It is desirable that the successive sections of the intake be of progressively larger cross-sectional area, section 19 being larger than 14, and section 20 being larger than 19, so as to accommodate the successive increments of the volume flowing, and it is likewise desirable that the section 19 be long enough or wide enough to afford a suitable time interval to permit substantially complete vaporization of the fuel liquid during its transit therethrough so that a minimum or at least very little fuel in liquid form shall reach the interior of the engine. It will now be observed that the fuel nozzle 16 is comparable to the spray nozzle of an ordinary carburetor, the valve 15 corresponding to the primary air entrance therefor and the valve 18 to the common auxiliary air entrance, and that the function of the burner products is to impart heat to the primary air prior to its contact with the fuel to facilitate its vaporizing action thereon. For this purpose the admission of primary air (at valve 15) is in such quantity, or in such manner as to extinguish the flame or at least to protect the incoming fuel from such contact with it as would result in further or continued combustion at the fuel jet, igniting and consuming the fuel therefrom, which is of course to be avoided. It will be obvious that this result may be accomplished in a variety of ways without requiring the location of the burner, or source of flame, to be at a too remote point to conform to practical conditions. For compactness and to save waste of heat the intake passage may be constructed of relatively small compass by making the sections 14 and 19 in coil form or otherwise, although not so illustrated in the drawing.

The heating effect of the suction burner cannot be effectually utilized in the manner stated unless the suction which causes its operation is maintained within operative or burning limits, irrespective of a considerable variation of inflow of air through the valves 15 and 18 corresponding to the change of speed and load of the engine, and as determined by the throttle. Without a definite coordination between what may be called the carburetor part of the apparatus and the burner part, the equipment could not accommodate the constantly varying conditions of automotive engine use, and I have provided for such coordination in Fig. 1 by the selection and adjustment of the springs of the air valves 13, 15 and 18, so that the obstruction they offer to the inflow of air not only maintains suction on the burner and keeps up the burning action therein but also maintains a proper proportionate delivery of liquid fuel from the nozzle 16 which with the burner products and air constitutes the ultimate engine-operating medium. This function is accomplished in the best way by arranging the valve 13 so that it opens under a slightly less pressure difference, i. e., a less suction effect, than the valve 15, and also by making the air flow capacity of the entrance at this point less than at the entrance 15 and the latter less than at the entrance 18. It should be pointed out, moreover, that the further function of the air valve 13 is to maintain constant proportion of the fuel and air entering the burner and serving to produce the flame. The operation of the apparatus is not satisfactory or practical unless these proportions are kept substantially the same for low as well as high speeds of the engine. The air holes 7 being always open to atmosphere and the air entrance 13 being variably restricted by the valve gives substantially constant proportions of fuel and air in the flame. Such proportions may be set in the first instance by regulating needle valve 9 after the tension of valve spring 13 has been previously set with reference to valves 15 and 18.

Substantially equivalent results may be secured without a valve control of the air entering the burner by organizing the apparatus according to the principle of operation illustrated by Figs. 5 and 6. In this arrangement the burner is connected as before, to the primary air entrance 15 and is constituted of a shell 35, with perforations to admit air directly from atmosphere into the interior. The perforations are protected by a hood or covering 36. The spray nozzle 37 is the same as that of Fig. 4 with air holes 7 also admitting air directly from atmosphere. The fuel duct of the nozzle draws its fuel liquid from a well 38 extending below the level in the float chamber 11 and connected to it, at the bottom, through a normally restricted passage regulated by the screw 39. The tube 40 from the nozzle extends downwardly into the well to a point near its bottom and near or below its middle is provided with a hole 41. Air may enter the top of the well through a regulated opening 42. The normal liquid level in the well is the same as in the carburettor and indicated by a line. When the suction effect of the intake passage is extended to this form of burner the upward flow through the tube 40 lowers the level in the well until a point is reached where the outflow through the tube equals the inflow to the well as permitted by the restricting screw 39. The hole 41 is located at about this level and draws in fuel until the liquid sinks to or below it, after which it draws in air from the well. The screw 42 admits air to the well at such rate, compared to the hole 41, as to maintain a slight suction in the well varying with the suction effect on the burner and causing the flow of fuel to the well to vary accordingly. By this means the proportions of the fuel and air entering the burner are maintained constant throughout a considerable range of varying suction in the intake passage and without the employment of an air valve such as 13. In the initial operation of this burner, while the level of the liquid in the well is falling to its working level, an excess of fuel is delivered to the burner, making a temporary richness of burner mixture, which is desirable in a cold apparatus to facilitate prompt ignition.

In Fig. 2 the general arrangement will be recognized as similar to Fig. 1 except that the air entrances 21, 22 and 23, corresponding to 13, 15 and 18, are here positively and automatically controlled by the suction effect in the intake, outside the throttle, and in a predetermined relation to each other. For this purpose the diaphragm or bellows 24 is connected to the intake by the tube shown and actuates the slide valve 25 against the pull of a spring 26. The port openings in the valve member control the admission of air through each entrance and are so correlated that for any position of the throttle the correct relative amounts of air will automatically enter the several entrances to the intake passage to maintain the suction effect. The construction of the burner is the same as above and maintains constant proportions as before.

In Fig. 3 the air admission to the burner is by a spring-seated valve as in Fig. 1, and all the air for making up the engine charge enters at 27 under the automatic control of the slide valve 28 as in Fig. 2. This bellows and slide valve mechanism illustrated in Figs. 2 and 3 will be understood to be diagrammatically representative of any suitable means of mechanical coordination of valve mechanism. It will be understood that in the case of each of the figures referred to the intake passage shown is connected to the engine as indicated in Fig. 1 and that the engine is provided with a starting agency, either a hand crank or a motor pinion 30 by which it may be rotated or cranked. The spark plug 12 is connected to one of the points of the usual interrupter and distributor head 31, which latter is driven by the engine and represents a means of delivering current to said plug as well as to the plugs 32 in the engine proper. By closing the switch 33 and 34 shown in Fig. 1 the engine is cranked and the spark plug 12 simultaneously energized through the connection diagrammed. These connections merely represent the conventional ignition and starting system which is well understood in the art and need not therefore be further shown or described. The plug 12 can be connected with any of the usual ignition systems either as indicated, or to one of the engine spark plugs or direct to an engine-driven magneto if there be one, the object being merely to energize the said plug when the engine is rotated and so that the burner is automatically ignited when such rotation occurs.

When an engine equipped as above described is to be set in action it is rotated in the usual way, by closing the starting switch 33 and the usual ignition switch 34. The suction developed in the intake by cranking causes deliveries of fuel spray and air by the nozzle 6 and air entrance 13 (or 36) respectively, making a mixture in the burner which by ignition, results in a flame extending into the passage 14 as already described. This flame will so heat the air and the intake mechanism as to make the medium entering the engine readily ignitable therein, and the ignitable condition is hastened according to this invention by organizing the valve mechanism so that during the cranking of the engine (when the suction effect is much lower than during combustion running) the flame-diluting air or primary carburetor air entering by the valves 15 is momentarily restricted or shut off entirely, either by hand or automatically so that the maximum heating effect of the flame is available for initial heating. For this purpose the valve 15 is provided with a bell crank 31 and a connection, such as a pull rod or the like, whereby the operator may hold it closed or restrain its opening during cranking. If held closed the flame or its hot products will extend freely into admixture with the fuel from nozzle 16 and the latter will be vaporized thereby but without ignition because of the absence of sufficient air, and the resulting very hot mixture of flame products and fuel vapor is then mixed with the air from valve 18, making a rich medium hot enough to ignite very quickly in a cold engine and start it in action, whereupon a stronger suction effect is set up in the intake and continued by virtue of the combustion operation of the engine. The air valve 15 may then be released and allowed to admit that particular proportion of air for which it has been set as above described and which is sufficient to prevent combustion in section 19 while maintaining efficient vaporization. The same effect—of choking the air entrance 15—is accomplished automatically in Fig. 2, since the moderate suction resulting from cranking the engine is not sufficient to cause the bellows to open passage 22 wide enough to dilute or cool the flame from the burner, but when the engine picks up and the suction increases this entrance is opened and thereafter the normal operation takes place.

In case of Fig. 3, the initial closing of entrance 27 of course can not be complete, without excluding air necessary for combustion in the engine, but by restricting it, enough heat can be imparted to the passage to produce a very hot and a very rich mixture also capable of instant ignition in a cold engine. Such mixture may in fact be subject to partial combustion within the passage 19, but in any event forms a satisfactory engine-operating-medium. In any event there is produced an intensified burner effect at starting. It will be apparent that with the lighter and more volatile fuels, there is less need for this preliminary or initial restriction of the primary air, and that depending on the fuel it may be omitted entirely because the coordination of the air valve as above stated will suffice to keep the burner in action until, after a period of cranking, the engine charge will be warm enough to ignite and start the engine and it is also apparent from the description above that the restriction may be accomplished automatically by a great variety of means as by linkage to the main throttle or otherwise. In apparatus of the general form illustrated in Fig. 1 the suction effect created by the cranking should approximate 10 inches of water.

It is preferred after the engine has started, that the burner continue in operation through the full range of engine speed and that it deliver heat and burner products in substantially direct proportion to the delivery of fuel and air. The valve arrangement of Fig. 1 produces this result. In Fig. 2, the valve mechanism can be readily arranged to cut out the burner and stop the combustion therein when the engine reaches a certain speed or when the throttle 2 is opened to a predetermined position, and it is quite possible and practicable with some fuels to use the burner only for starting and until the engine is warm, thereafter cutting it off entirely or allowing it to deliver unignited mixture to the intake as a supplement to the mixture produced by the other parts of the apparatus.

Claims—

1. In an internal combustion engine the combination with a suction air entrance and a fuel nozzle acted on by the air flow therefrom, of a burner connected to said entrance and comprising suction operated means for maintaining constant proportions of the fuel and air burned therein.

2. In an internal combustion engine the combination of a suction-operated burner, means for maintaining constant proportions of fuel and air entering the same irrespective of change in the operating suction, an air entrance associated with the burner outlet, a fuel nozzle acted on by the mixture of said air and burner products and a throttle coincidently controlling the rate of flow through said entrances and nozzle.

3. In an internal combustion engine having a starting agency whereby it may be rotated, the combination with an air entrance and a fuel nozzle acted on by the air flow therefrom, of a suction-operated burner connected to said air entrance in advance of the fuel nozzle and comprising means for producing and igniting a cold mixture of fuel liquid and air, means for creating an operating suction on said burner when the engine is rotated by said starting agency and a common source of liquid fuel for said nozzle and burner.

4. The combination of an internal combustion engine, a starting agency therefor, suction means for admitting air and fuel liquid in explosive proportions, a suction burner for burning fuel and air connected to said air admission means and adapted to deliver flame or flame products into admixture with said air, prior to its mixture with the fuel, an electric igniter for said burner, a common source of liquid fuel for said engine and burner, and means for automatically energizing said igniter coincidently with the operation of said starting agency.

5. The combination of an internal combustion engine, having connected to its intake passage, a fuel nozzle and air admission means respectively delivering fuel liquid and air in explosive proportions, and a suction burner comprising means for producing and igniting a mixture of cold fuel liquid and air, and arranged to deliver its flame or hot flame products into admixture with air from said means before said air mixes with fuel from said nozzle and a common source for said fuel.

6. In an internal combustion engine the combination with the engine intake having a main fuel nozzle and an air entrance both connected to and operated by the suction in the intake, a burner also operated by the suction in the intake and arranged to deliver its flame or flame products into admixture with air from said entrance before the latter mixes with the fuel and flow-controlling means at said air entrance automatically acting to maintain an operative suction in the burner throughout a range of engine speeds.

7. In an internal combustion engine, an intake having a main fuel nozzle and primary and secondary air entrances correlated to deliver fuel and air in explosive proportions, a suction operated burner delivering flame or flame products into admixture with the primary air before it reaches the fuel nozzle and flow-controlling means at both said entrances automatically operating to maintain the burner in action throughout a range of engine speeds.

8. In an internal combustion engine, the combination with the engine intake having a main fuel nozzle and air admission means and a suction-operated burner delivering flame or flame products to the admitted air, before its mixture with fuel, and means for maintaining a continuous delivery of said burner products in substantially direct proportion to the continuous delivery of air and fuel by said means and nozzle.

9. In an internal combustion engine, an intake, means therein for creating an explosive mixture of fuel and air for combustion in the engine and comprising a fuel nozzle and air entrance, in combination with a continuous flame burner arranged to mix flame or flame products with such air before its mixture with the fuel, operated by the suction in the intake, and comprising a liquid fuel spraying means, an igniter and an air admission means, said latter means being organized to admit air to the burner in substantially constant proportion to the fuel spray.

10. In an internal combustion engine, an intake connected to the engine, a burner operated by the suction therein and comprising means for creating an atomized spray mixture of fuel liquid and air, an igniter for establishing non-explosive combustion of said spray, an entrance for admitting air to the intake to mix with and reduce the temperature of the flame or its products, a nozzle admitting fuel liquid to the resulting medium, and an engine throttle conjointly controlling the flows from said burner air entrance and fuel nozzle.

11. In an internal combustion engine, an intake having throttle-controlled connection with the engine, a burner connected to the intake outside the throttle and having a variable entrance for combustion-supporting air, and an igniter and adapted to create a continuous flame extending into the intake, in combination with an entrance for admitting air to the intake to dilute said flame or its products, a fuel orifice delivering fuel liquid to said diluted medium and means for controlling the flow through said air entrances adapted to maintain an operative suction effect on the burner through a range of throttle positions.

12. In an internal combustion engine, the combination of a suction intake, having a section of relatively large flow capacity adjacent the engine cylinders and one or more sections of smaller flow capacity in advance thereof, means for admitting fuel and air to a smaller section, and a suction burner connected to and operated by the suction effect in said smaller section and adapted to deliver continuous flame or continuous flame products into the air stream flowing therein prior to its mixture with the fuel therein.

13. In an internal combustion engine, the combination with an air entrance and a fuel nozzle acted upon by the air flowing from said entrance of a suction-operated burner connected to said entrance in advance of the fuel nozzle and flow-restricting means for said entrance correlated with said burner and fuel nozzle to maintain from the former a continuous delivery of flame products and from the latter a delivery of fuel suited to form an explosive medium in the engine.

14. In an internal combustion engine, the combination with the suction intake having an air entrance, a suction burner for mixing flame or flame products with said air, means for admitting fuel liquid to the hot mixture thereby resulting, and means for temporarily restricting said air flow so that the fuel liquid is initially admitted into flame, or flame products, with less than normal or no air therein.

15. The method of operating internal combustion engines having a suction intake receiving variable deliveries of a mixture of fuel and air in explosive proportions, which method consists in causing the suction effect to create another mixture of fuel and air, igniting the same in a cold state, heating the air of said first mentioned mixture by admixing it with the flame or flame products resulting from the ignition before it is mixed with the fuel of said first mentioned mixture, and without inflaming said fuel, and maintaining the rate of delivery of said flame or flame products substantially proportional to the said variable delivery of said first mentioned mixture.

16. The method of starting an internal combustion engine having a suction intake receiving liquid fuel and air in explosive proportions, which consists in creating a flame, initally vaporizing the liquid fuel by directly mixing it with said flame or its hot products without causing combustion of said fuel, adding air to said vaporized mixture and thereby making an engine-operating medium which is admitted to the engine while the same is being cranked and thereafter diluting the flame by admission of air thereto and then vaporizing the fuel liquid by delivering it into said diluted medium.

17. The method of starting and operating an internal combustion engine having a suction intake receiving air through a passage co-acting with a liquid fuel jet, which consists in initially admitting flame through said passage to the exclusion of some or all of the normal air flow therethrough, thereby vaporizing the fuel while the engine is being cranked, and thereafter restoring the normal air flow through said entrance.

In testimony whereof, I have signed this specification.

JOHN GOOD.